United States Patent
Litvin et al.

(10) Patent No.: US 8,787,669 B2
(45) Date of Patent: Jul. 22, 2014

(54) COMPOUND OBJECT SEPARATION

(75) Inventors: Andrew Litvin, Wakefield, MA (US); Sergey Simanovsky, Brookline, MA (US); Ram Naidu, Newton, MA (US)

(73) Assignee: Analogic Corporation, Peabody, MA (US)

(*) Notice: Subject to any disclaimer, the term of this patent is extended or adjusted under 35 U.S.C. 154(b) by 489 days.

(21) Appl. No.: 13/121,892

(22) PCT Filed: Sep. 30, 2008

(86) PCT No.: PCT/US2008/078268
§ 371 (c)(1),
(2), (4) Date: Mar. 30, 2011

(87) PCT Pub. No.: WO2010/039123
PCT Pub. Date: Apr. 8, 2010

(65) Prior Publication Data
US 2011/0188751 A1 Aug. 4, 2011

(51) Int. Cl.
*G06K 9/34* (2006.01)
(52) U.S. Cl.
USPC ............ 382/173; 381/131; 381/170; 381/266
(58) Field of Classification Search
CPC ........ G01V 5/005; G06K 9/6219; G06T 3/40; G06T 2207/10016; G06T 2207/10028; H04N 13/0003
USPC ......... 382/170, 171, 190, 168, 154, 131, 205, 382/257, 173, 100
See application file for complete search history.

(56) References Cited

U.S. PATENT DOCUMENTS

| | | | | |
|---|---|---|---|---|
| 4,903,202 A | * | 2/1990 | Crawford | 382/131 |
| 4,905,148 A | * | 2/1990 | Crawford | 382/131 |
| 6,067,366 A | * | 5/2000 | Simanovsky et al. | 382/100 |
| 6,078,642 A | | 6/2000 | Simanovsky et al. | |
| 6,128,365 A | | 10/2000 | Bechwati et al. | |
| 6,195,444 B1 | * | 2/2001 | Simanovsky et al. | 382/100 |
| 6,245,027 B1 | * | 6/2001 | Alperin | 600/561 |
| 6,317,509 B1 | * | 11/2001 | Simanovsky et al. | 382/131 |
| 6,345,113 B1 | | 2/2002 | Crawford et al. | |
| 7,031,430 B2 | | 4/2006 | Kaucic, Jr. et al. | |

(Continued)

OTHER PUBLICATIONS

Yu-Jin Zhang et al: "Unbalanced region matching based on two-level description for image retrieval" Pattern Recognition Letters Elsevier Netherlands, vol. 26, no. 5, Apr. 1, 2005, pp. 565-580.

(Continued)

*Primary Examiner* — Mekonen Bekele
(74) *Attorney, Agent, or Firm* — Cooper Legal Group LLC

(57) ABSTRACT

Representations of an object can comprise two or more separate sub-objects, producing a compound object. Compound objects can affect the quality of object visualization and threat identification. As provided herein, a compound object can be separated into sub-objects based on object morphological properties (e.g., an object's shape, surface area). Further, a potential compound object can be split into sub-objects, for example, eroding one or more outer layers of volume space (e.g., voxels) from the potential compound object. Additionally, a volume of a representation of the sub-objects in an image can be reconstructed, for example, by generating sub-objects that have a combined volume approximate to that of the compound object. Furthermore, sub-objects, which can be parts of a same physical object, but may have been erroneously split, can be identified and merged using connectivity and compactness based techniques.

20 Claims, 10 Drawing Sheets

(56) References Cited

U.S. PATENT DOCUMENTS

| | | | |
|---|---|---|---|
| 7,583,829 B2* | 9/2009 | Kiraly et al. | 382/128 |
| 7,660,481 B2* | 2/2010 | Schaap et al. | 382/266 |
| 2006/0056685 A1* | 3/2006 | Kiraly et al. | 382/165 |
| 2007/0014471 A1* | 1/2007 | Simanovsky et al. | 382/170 |
| 2007/0110294 A1* | 5/2007 | Schaap et al. | 382/131 |

OTHER PUBLICATIONS

Gurcan Metin N et al : "Lung nodule detection on thoracic computed tomography images : Preliminary evaluation of a computer-aided diagnosis system" A Medical Physics, AIP , Melville, NY, US, vol. 29, No. 11, Nov. 1, 2002,, pp. 2552-2558.

Zhanyu Ge et al: "Computer-aided detection of lung nodules: false positive reduction using a 3D gradient field method and 3D ellipsoid fitting" Medical Physics AIP for American Assoc. Phys. Med USA , vol. 32, No. Aug. 8, 2005, pp. 2443-2454.

International Search Report in related PCT application no. PCT/US2008/078268 dated Jul. 24, 2009.

* cited by examiner

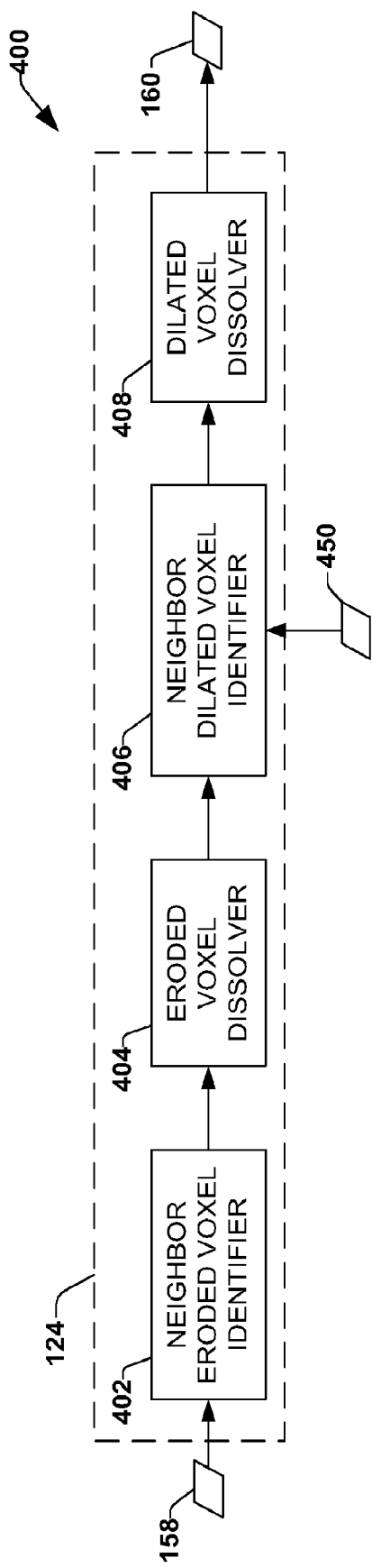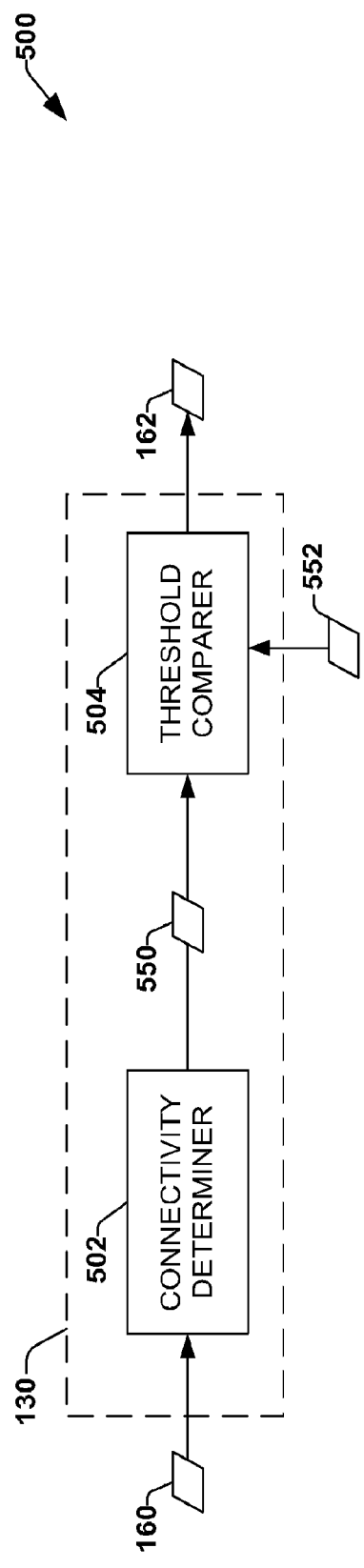

COMPOUND OBJECT SEPARATION

BACKGROUND

Security at airports and in other travel related areas is an important issue given today's sociopolitical climate, as well as other considerations. One technique used to promote travel safety is through baggage inspection. Often, an imaging apparatus is utilized to facilitate baggage screening. For example, an x-ray machine may be used to provide security personnel with a substantially two dimensional view of the contents of a bag and/or a computed axial tomography (CAT) device may be used to provide two and/or three dimensional views of objects. After viewing images provided by the imaging apparatus, security personnel may make a decision as to whether the baggage is safe to pass through the security check-point or if further (hands-on) inspection is warranted.

Current screening techniques and systems can utilize automated object recognition in images from an imaging apparatus, for example, when screening for potential threat objects inside luggage. These systems can extract an object from an image, and compute properties of these extracted objects. Properties of scanned objects can be used for discriminating an object by comparing with known properties of threat items. It can be appreciated that an ability to discriminate potential threats may be reduced if an extracted object comprises multiple distinct physical objects. Such an extracted object is referred to as a compound object.

A compound object can be made up of two or more distinct items. For example, if two items of similar density are lying side by side and/or touching each other, a security scanner system may extract the two items as one single compound object. Because the compound object actually comprises two separate objects, however, properties of the compound object may not be able to be effectively compared with those of known threat and/or non-threat items. As such, for example, luggage containing a compound object may unnecessarily be flagged for additional (hands-on) inspection because the properties of the compound object resemble properties of a known threat object. This can, among other things, reduce the throughput at a security checkpoint. Alternatively, a compound object that should be inspected further may not be so identified because properties of a potential threat object in the compound object are "contaminated" or combined with properties of one or more other (non-threat) objects in the compound object, and these "contaminated" properties (of the compound object) more closely resemble those of a non-threat object than those of a threat object.

Compound object splitting can be applied to objects in an attempt to improve threat item detection, and thereby increase the throughput and effectiveness at a security check-point. Compound object splitting essentially identifies potential compound objects and splits them into sub-objects. Compound object splitting involving components with different densities may be performed using a histogram-based compound object splitting algorithm. Other techniques include using surface volume erosion to split objects. However, erosion when used as a stand-alone technique to split compound objects can lead to undesirable effects. For example, erosion can reduce a mass of an object, and indiscriminately split objects that are not compound, and/or fail to split some compound objects. Additionally, in these techniques, erosion and splitting may be applied universally, without regard to whether an object is a potential compound object at all.

SUMMARY

Aspects of the present application address the above matters, and others. According to one aspect, a system for splitting compound objects into one or more sub-objects in a subject image resulting from subjecting one or more objects to imaging using an imaging apparatus includes an entry control configured to identify a potential compound object based on an object's features, a compound object splitter configured to generate sub-objects from the potential compound object by eroding one or more layer of volume space from the potential compound object, and a volume reconstructor configured to generate image data comprising distinct sub-objects having a combined volume approximate to a volume of the potential compound object.

According to one aspect, a method for separating a compound object into sub-objects in an image generated by an imaging apparatus comprises identifying a potential compound object based on an object's features, splitting a potential compound object into sub-objects comprising eroding one or more outer layers of volume space from the potential compound object, and reconstructing a volume of image data for the sub-objects comprising generating sub-objects having a combined volume approximate of the compound object.

According to one aspect, a system of separating a compound object into sub-objects in an image generated by a computer tomography (CT) scanner comprises an entry control configured to identify a potential compound object based on an object's features, in image data comprising one or more objects scanned by a CT scanner, a volume reconstructor configured to generate image data comprising distinct sub-objects having a combined volume approximate to a volume of the potential compound object, a connectivity merger configured to merge distinct sub-objects in the image data having a connectivity ratio within a pre-determined connectivity threshold, and a compactness merger configured to merge distinct sub-objects in the image data that have a compactness ratio within a pre-determined compactness threshold.

According to one aspect, a computer usable medium comprising computer readable programming configured to separate a compound object into sub-objects in an image generated by an imaging apparatus, which when executed on a computing device, causes the computing device to identify a potential compound object based on an object's features, split a potential compound object into sub-objects comprising eroding one or more outer layers of volume space from the potential compound object, reconstruct a volume of image data for the sub-objects comprising generating sub-objects having a combined volume approximate to a volume of the compound object, merge connected sub-objects, split from a potential compact object, that have a connectivity ratio meeting a pre-determined connectivity threshold, and merge compact sub-objects, split from a potential compact object, that have a compactness ratio meeting a pre-determined compactness threshold.

Those of ordinary skill in the art will appreciate still other aspects of the present invention upon reading and understanding the appended description.

DESCRIPTION OF THE DRAWINGS

FIG. 4 is another component block diagram illustrating details of one or more components of an environment wherein compound object splitting of objects in an image may be implemented as provided herein.

FIG. 5 is a schematic block diagram illustrating one embodiment of one or more components of an environment wherein compound object splitting of objects in an image may be implemented as provided herein.

DETAILED DESCRIPTION

Figure 1:
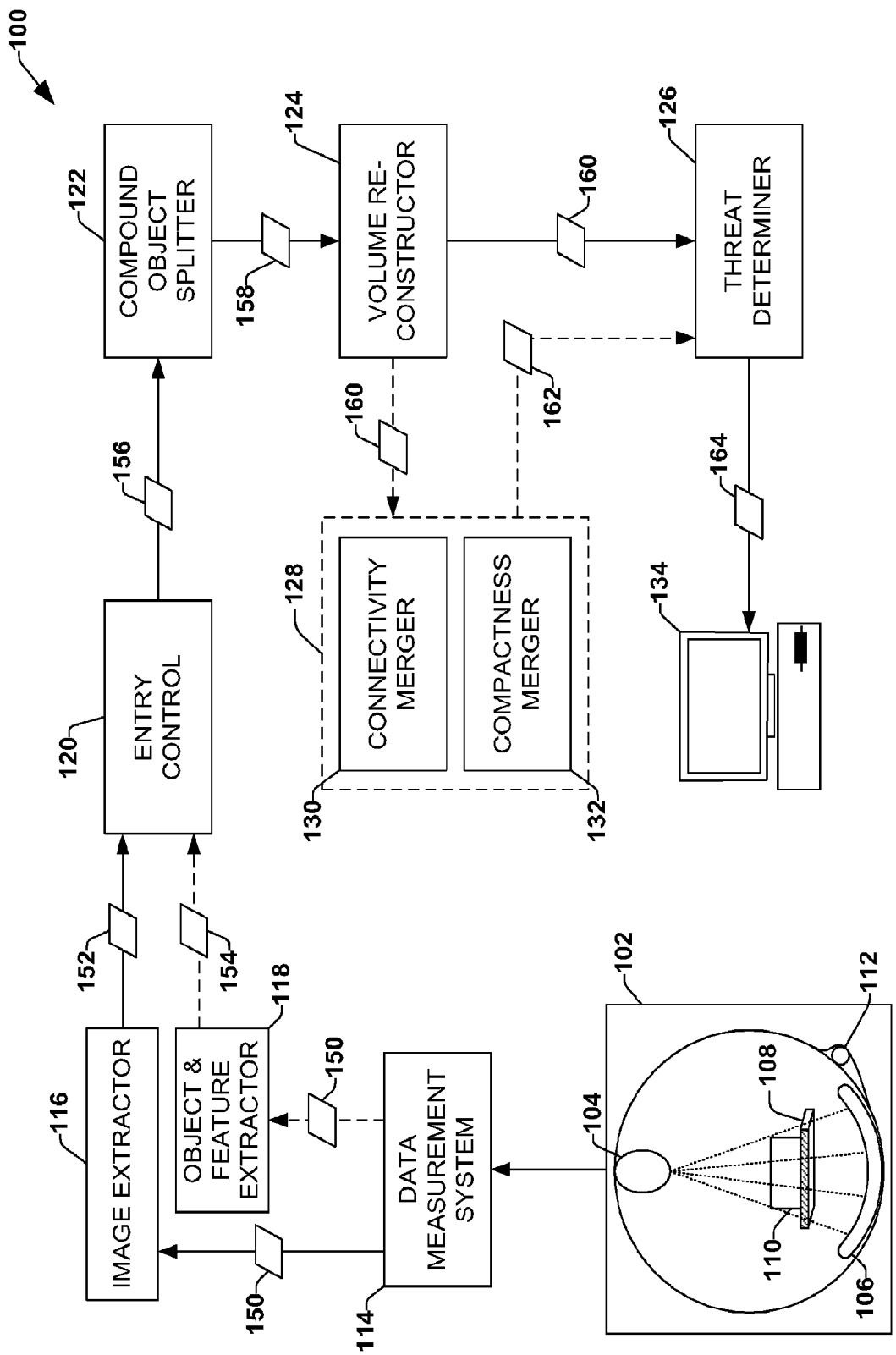
FIG. 1 is a schematic block diagram illustrating an environment wherein compound object splitting of objects in an image may be implemented, as provided herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Systems and techniques for separating a compound object representation into sub-objects in an image generated by subjecting one or more objects to imaging using an imaging apparatus (e.g., a computed axial tomography (CAT) image of a piece of luggage under inspection at a security station at an airport) are provided herein. That is, in one embodiment, techniques and systems for splitting compound objects of similar density, having a relatively weak connection, into distinct sub-objects.

FIG. 1 is an illustration of an example environment 100 in which a system may be employed for identifying potential threat containing objects, from a class of objects, inside a container that has been subjected to imaging using an imaging apparatus (e.g., a CAT scanner). In the example environment 100 the imaging apparatus comprises an object scanning apparatus 102, such as a security scanning apparatus (e.g., used to scan luggage at an airport). The scanning apparatus 102 may be used to scan one or more objects 110 (e.g., a series of suitcases at the airport). The scanning apparatus typically comprises a radiation source 104 (e.g., an X-ray tube), an array of radiation detectors 106 (e.g., X-ray detectors), a rotator 112 (e.g., a gantry motor) for rotating the radiation source 104 and detectors 106 around the object(s) being scanned 110, and a conveyor 108 configured to convey the object(s) 110 from an upstream portion of the object scanning apparatus 102 to a downstream portion. It will be appreciated that, while the example environment utilizes an x-ray scanning apparatus, the systems and techniques, described herein, are not limited to x-rays or scanning devices. For example, the system may utilize an infrared imaging device to generate images based on infrared imaging of one or more objects.

As an example, a computer tomography (CT) security scanner 102 that includes an X-ray source 104, such as an X-ray tube, can generate a fan, cone, wedge, or other shaped beam of X-ray radiation that traverses one or more objects 110, such as suitcases, in an examination region. In this example, the X-rays are emitted by the source 104, traverse the examination region that contains the object(s) 110 to be scanned, and are detected by an X-ray detector 106 across from the X-ray source 104. Further, a rotator 112, such as a gantry motor drive attached to the scanner, can be used to rotate the X-ray source 104 and detector 106 around the object(s) 110, for example. In this way, X-ray projections from a variety of perspectives of the suitcase can be collected, for example, creating a set of X-ray projections for the object(s). While illustrated as a CT system, those of ordinary skill in the art will understand that other implementations such as line scanners are also contemplated. As yet another example, the radiation source 104 and detector 106 may remain stationary while the object is rotated.

In the example environment 100, a data measurement system 114 is operably coupled to the scanning apparatus 102, and is typically configured to collect information and data from the detector 106, and may be used to compile the collected data into projection space data 150 for an object 110. As an example, X-ray projections may be acquired at each of a plurality of angular positions with respect to the object 110. Further, as the conveyor 108 conveys the object(s) 110 from an upstream portion of the object scanning apparatus 102 to a downstream portion (e.g., conveying objects parallel to the rotational axis of the scanning array), the plurality of angular position X-ray projections may be acquired at a plurality of points along an axis of the conveyor with respect to the object(s) 110. In one embodiment, the plurality of angular positions may comprise an X and Y axis with respect to the object(s) being scanned, while the conveyor axis may comprise a Z axis with respect to the object(s) being scanned.

In the example environment 100, an image extractor 116 is coupled to the data measurement system 114, and is configured to receive the data 150 from the data measurement system 114 and generate image data 152 indicative of the scanned object 110 using a suitable analytical, iterative, and/or other reconstruction technique (e.g., backprojecting from projection space to image space).

In one embodiment, the image data 152 for a suitcase, for example, may ultimately be displayed on a monitor 134 (e.g., desktop or laptop computer) for human observation. In this embodiment, an operator may isolate and manipulate the image, for example, rotating and viewing the suitcase from a variety of angles, zoom levels, and positions.

It will be appreciated that, while the example environment 100 utilizes the image extractor 116 to extract image data from the data 150 generated by the data measurement system 114, for example, for a suitcase being scanned, the techniques and systems, described herein, are not limited to this embodiment. In another embodiment, for example, image data may be generated by an imaging apparatus that is not coupled to the system. In this example, the image data may be stored onto an electronic storage device (e.g., a CD ROM, harddrive, flash memory) and delivered to the system electronically.

In the example environment 100, in one embodiment, an object and feature extractor 118 may receive the data 150 from the data measurement system 114, for example, in order to extract objects and features 154 from the scanned items(s) 110 (e.g., a carry-on luggage containing items). It will be appreciated that the systems, described herein, are not limited to having an object and feature extractor 118 at a location in the example environment 100. For example, the object and feature extractor may be a component of the image extractor 116, whereby image data 152 and object features 154 are both sent from the image extractor 116. In another example, the object and feature extractor 118 may be disposed after the image extractor 116 and may extract object features 154 from image data 152. Those skilled in the art may devise alternative arrangements for supplying image data 152 and object features 154 to the example system.

In the example environment 100, an entry control 120 may receive image data 152 and object features 154 for the one or more scanned objects 110. The entry control 120 can be configured to identify a potential compound object in the image data 152 based on an object's features. In one embodiment, the entry control 120 can be utilized to select objects that may be compound objects 156 for processing by a system for compound object splitting. In this embodiment, for example, object features 154 (e.g., properties of an object in an image, such as an Eigen-box fill ratio) can be computed prior to the entry control 120 and compared with pre-determined features for compound objects (e.g., features extracted from known compound objects during training of a system) to determine whether the one or more objects are compound objects. In this example, objects that are not determined to be potential compound objects by the entry control 120 may not be sent through the compound object splitting system.

In the example environment 100, a compound object splitter 122 receives image data comprising a potential compound object 156 from the entry control 120. The compound object splitter 122 can be configured to generate sub-objects from the potential compound object by eroding one or more layers of volume space from the potential compound object (e.g., layers of voxels from a representation of the potential compound object in a three-dimensional image).

As an example, one or more surface layer of voxels can be removed from a representation of the potential compound object in an image, which may effectively split the potential compound object into two or more sub-objects 158. However, in this example, if the potential compound object remains compound after removal of a first layer of voxels the compound object splitter 122 can continue to remove layers until the potential compound object is separated into two or more sub-objects 158. Alternatively, more than one layer of voxels can be consecutively removed before checking if the potential compound object is separated into two or more sub-objects 158.

In the example environment 100, a volume reconstructor 124 can be configured to generate image data 160 comprising distinct sub-objects having a combined volume approximate a volume of the potential compound object. In one embodiment, for example, those voxels that were eroded from the potential compound object by the compound object splitter 122 can be returned to the sub-objects 158. In this example, respective layers of eroded voxels can be returned to an adjacent sub-object (e.g., the voxel was adjacent to that portion of the potential compound object when it was eroded), thereby increasing a volume of the sub-objects.

Further, in this embodiment, a number of sub-objects can be maintained while the respective eroded voxels are returned to the sub-objects, for example, by layer. In this way, for example, the volume reconstructed sub-objects 160 can have a volume approximate to the volume of the potential compound object from which they came, while maintaining a number of sub-objects separated by the compound object splitter 122.

In the example environment 100, in one embodiment, image data for volume reconstructed sub-objects 160 can be sent to a merging component 128, which comprises a connectivity merger 130. In this embodiment, the connectivity merger 130 can be configured to merge distinct sub-objects having a connectivity ratio within a pre-determined connectivity threshold, for example, generating image data comprising merged sub-objects 162. While the compound object splitter 122 can separate a potential compound object into sub-objects, for example, there may be circumstances where a sub-object is not a separate object but a physical part of a distinct physical object (e.g., an undesirable splitting of the potential compound object has occurred).

When such undesirable splitting occurs, in one embodiment, the connectivity merger 130 can compare connection information between sub-objects with a threshold ratio, for example, to determine whether the sub-objects should be merged.

In the example environment 100, in one embodiment, a merging component may comprise a compactness merger 132, which can be configured to merge distinct sub-objects that have a compactness ratio within a pre-determined compactness threshold, for example, generating image data that comprises merged sub-objects 162. As an example, a physical object that is not a compound object (e.g., not made up of more than one object) is typically considered to be compact (e.g., when placed in a box, they fill a large portion of the box). However, in this example, objects that are randomly placed in a bag for scanning, resulting in an image comprising a representation of a compact object (e.g., made up of more than one separate physical object), are typically disposed in a manner that is not compact (e.g., when placed in a box, they fill a smaller portion of the box).

In one embodiment, the compactness merger 132 can compare a compactness ratio of two or more sub-objects to a threshold, to determine whether the sub-objects should be merged. In this way, for example, representations of physical objects that have been undesirably separated in the image data for the physical objects can be merged back together as a single physical object for potential threat detection.

It will be appreciated that the systems and techniques, described herein, are not limited to having the connectivity merger 130 and compactness merger 132 disposed as described. Those skilled in the art may devise alternate arrangements and embodiments for these components. For example, the connectivity merger 120 may receive volume reconstructed sub-object image data 160 and determine whether any sub-objects can be merged, then pass the resulting data to the compactness merger 130 to determine whether any remaining sub-objects can be merged. Further, in another example, respective merger components may act independently upon volume reconstructed sub-object image data 160, yielding a combination of merged and non-merged sub-object image data 162.

In the example environment 100, a threat determiner 126 can receive image data for an object, which can comprise volume reconstructed sub-objects 160, and/or a combination of merged sub-objects and non-merged sub-objects 162. The threat determiner 126 can be configured to compare the image data to one or more pre-determined thresholds, corresponding to one or more potential threat objects. It will be appreciated that the systems and techniques provided herein are not limited to utilizing a threat determiner, and may be utilized for separating compound objects without a threat determiner.

Information concerning whether a scanned object is potentially threat containing and/or information concerning sub-objects 164 can be sent to a terminal 134 in the example environment 100, for example, comprising a display that can be viewed by security personal at a luggage screening checkpoint. In this way, in this example, real-time information can be retrieved for objects subjected to scanning by a security scanner 102.

In one aspect, separate physical objects that comprise similar densities and lie in such proximity to each other that, when subjected to imaging, can yield an image that represents the separate objects as a single object. Such representations are commonly referred to as "compound objects," and systems described herein can separate these compound objects into sub-objects, that may comprise the separate physical objects. However, one may wish to select merely compound objects to subject to separation, for example, to increase computational efficiency and reduce a possibility of separation error. In one embodiment, the systems described herein can separate an object at "weak connectivity points;" however, areas of weak connectivity can be present in objects that are not compound. Therefore, an entry control may be used to identify a potential compound object in image data.

Figure 2:
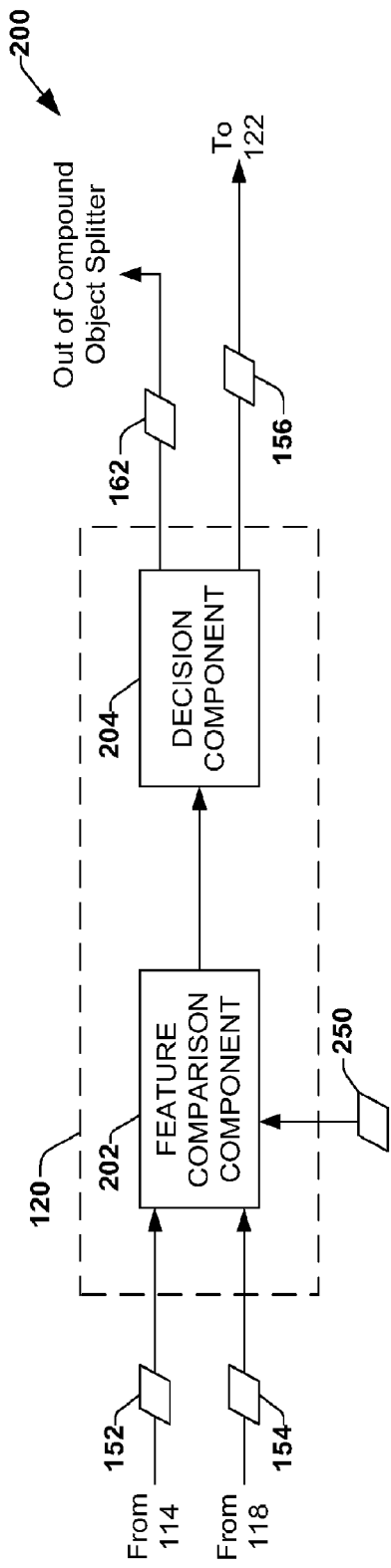
FIG. 2 is a component block diagram illustrating one or more components of an environment wherein compound object splitting of objects in an image may be implemented as provided herein.

FIG. 2 is a component block diagram illustrating one embodiment 200 of an entry control 120, which can be configured to identify a potential compound object based on an object's features. The entry control 120 can comprise a feature threshold comparison component 202, which can be configured to compare the respective one or more feature values 154 to a corresponding feature threshold 250.

In one embodiment, image data 152 for an object in question can be sent to the entry control 120, along with one or more corresponding feature values 154. In this embodiment, feature values 154 can include, but not be limited to, an object's shape properties, such as an Eigen-box fill ratio (EBFR) for the object in question. As an example, objects having a large EBFR typically comprise a more uniform shape; while objects having a small EBFR typically demonstrate irregularities in shape. In this embodiment, the feature threshold comparison component 202 can compare one or more object feature values with a threshold value for that object feature, to determine which of the one or more features indicate a compound object for the object in question.

In the example embodiment 200, the entry control 120 can comprise an entry decision component 204, which can be configured to identify a potential compound object based on a combination of results from the feature threshold comparison component 202. In one embodiment, the decision component 204 may identify a potential compound object based on a desired number of positive results for respective object features, the positive results comprising an indication of a potential compound object. As an example, in this embodiment, a desired number of positive results may be one hundred percent, which means that if one of the object features indicates a non-compound object, the object may not be sent to be separated 162. However, in this example, if the object in question has the desired number of positive results (e.g., all of them) then the image data for the potential compound object can be sent for separation 156.

In another aspect, separating a potential compound object into sub-object can be performed by erosion of volume space around the object. For example, one or more layers of volume space can be eroded from the object until the object is separated at a weak connection point (e.g., a point where two sub-objects may be thinly connected). Once the potential compound object is separated into two or more sub-objects, for example, one may wish to individually identify and count the newly created sub-objects.

Figure 3:
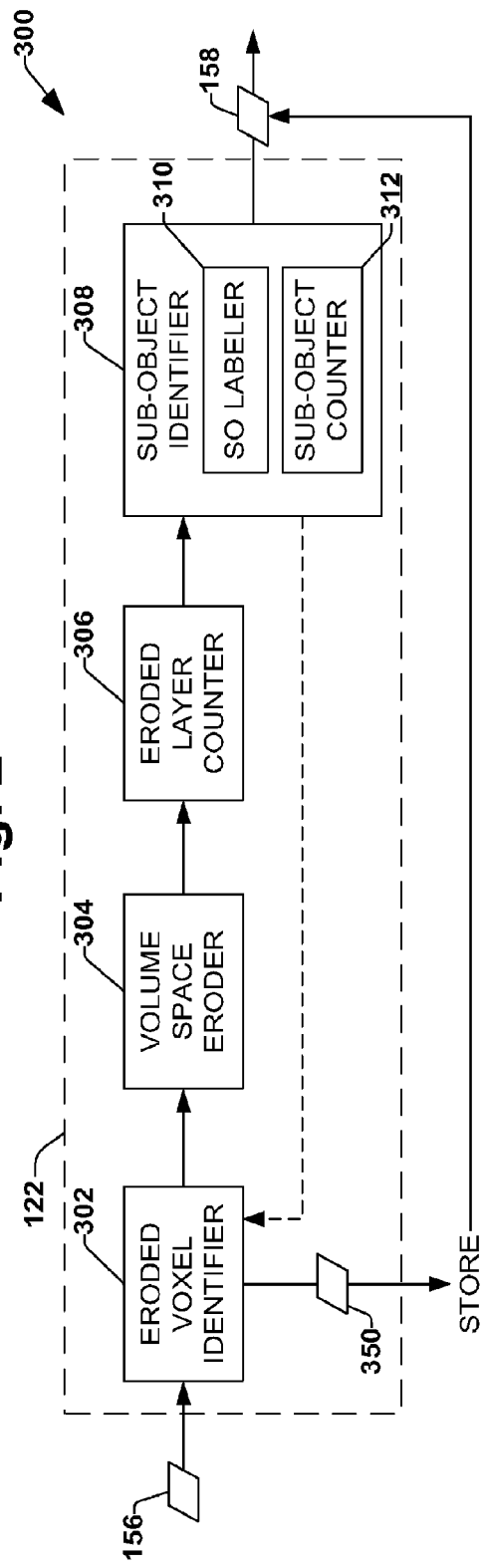
FIG. 3 is a component block diagram illustrating details of one or more components of an environment wherein compound object splitting of objects in an image may be implemented as provided herein.

FIG. 3 is a component block diagram of one example embodiment 300 of a compound object splitter 122, which can be configured to generate sub-objects. The example embodiment of the compound object splitter 122 comprises an eroded voxel identifier 302 configured to identify a set of eroded voxels 350 as an outer layer of the potential compound object. In this embodiment, data for one or more respective sets of eroded voxels can be stored, for example, for later use. For example, a representation of a potential compound object in an image can be comprised of voxels, and the eroded voxel identifier 302 can identify one or more outer layer of voxels of the representation in the image to be eroded.

In the example embodiment 300, the compound object splitter 122 further comprises a volume space eroder 304, which can be configured to erode one or more surface layer of voxels from a potential compound object. As an example, the volume space eroder 304 can remove the outer layer of voxels from the potential compound object that was identified by the eroded voxel identifier 302. An eroded layer counter 306 can be configured to count a number of layers eroded from the compact object, for example, after respective layers are removed by the volume space eroder 304.

The compound object splitter 122 further comprises a sub-object identifier 308, which can be configured to identify sub-objects from a potential compound object subjected to volume space erosion. As an example, the sub-object identifier 308 can be used to determine whether the compound object has been separated into two or more sub-objects (e.g., using connected component analysis) after respective volume space erosions (e.g., outer layers of voxels removed). In this example, if the sub-object identifier 308 determines that the potential compound object has not been separated, the image data can be sent back to the eroded voxel identified 302 for erosion of a next outer layer of voxels.

Further, in this example embodiment 300, the sub-object identifier 308 can comprise a sub-object labeler 310, which may be configured to generate an image of differently labeled sub-objects from the potential compound object. For example, if the sub-object identifier 308 determines that the potential compound object has been separated into sub-objects, the sub-object labeler 310 can generate different labels for the respective sub-objects in an image comprising representations of the sub-objects. In this way, in this example, respective sub-objects may be identified as separate and different objects in the image.

Additionally, in this example embodiment 300, the sub-object identifier 308 can comprise a sub-object counter 312, which can be configured to count a number of sub-objects from the potential compound object. For example, a correct number of sub-objects can be associated with the potential compound object that was separated in order to facilitate later volume reconstruction and possible merging.

In another aspect, sub-object data 158 generated by the compound object splitter 122 can comprise merely representations of sub-objects having a volume that has been reduced by the erosion of volume space from the surface. In one embodiment, one may wish to maintain an original volume of respective sub-objects, for example, so that a threat determiner 126 may be able to generate accurate results for the sub-objects. In this example, if the sub-objects have less volume, they may not match up with threshold comparisons utilized by the threat determiner 126.

FIG. 4 is a component block diagram of an example embodiment 400 of a volume reconstructor 124 that can be configured to generate image data comprising distinct sub-objects having a combined volume approximate a volume of the potential compound object. In this example embodiment 400, the volume reconstructor 124 comprises a neighboring eroded voxel identifier 402, which can be configured to identify one or more voxels in a set of eroded voxels that are spatially connected to one or more voxels in a sub-object.

For example, the neighboring eroded voxel identifier 402 can identify those voxels from one or more set of voxels (e.g., comprising surface layers of voxels from the potential compound object) that were eroded by the compound object splitter 122 (e.g., as identified by the eroded voxel identifier, see FIG. 3, 302) that were spatially connected to voxels in the one or more sub-objects. In this example, a neighborhood of respective voxels is checked to determine if the voxel neighbors any sub-object. A first set of voxels to be identified may be a last layer of voxels that were eroded, as they are likely to be spatially connected to the outer layer of voxels in the sub-objects. In this way, in this example, an appropriate sub-object for those voxels that were eroded can be identified, corresponding to a sub-object to which they were spatially connected before erosion.

In the example embodiment 400, the volume reconstructor 124 further comprises an eroded voxel dissolver 404, which can be configured to dissolve a set of eroded voxels into the sub-objects. As an example, those eroded voxels identified by the neighboring eroded voxel identifier 402 as being spatially connected to voxels in the sub-object can be returned to the sub-object by the eroded voxel dissolver 404. In this way, for example, one or more sets of previously eroded voxels (e.g., comprising one or more respective layers of eroded voxels) can be dissolved into (e.g., returned to) the sub-objects to which they were previously spatially connected prior to erosion. In this example, a number of sub-objects can be maintained while a volume for respective sub-objects is increased.

In the example embodiment 400, the volume reconstructor 124 further comprises a neighboring dilated voxel identifier 406, which can be configured to identify one or more voxels in a set of dilated voxels 450 that are spatially connected to one or more voxels in a sub-object. In one embodiment, dilated voxels 450 may be generated by a voxel dilator component of a bulk object identification system, for example, in which the compound object separation system, described herein, may be disposed. In this embodiment, dilated voxels can comprise a subset of a plurality of image elements that comprise an object in an imaging image.

For example, during object identification and separation in the bulk object identification system, a representation of the object in question may have been dilated to incorporate one or more outer layers of voxels that met some threshold for dilation. In this example, dilated voxels 450 that neighbor voxels in the sub-objects, and an appropriate location for the dilated voxels, can be identified. In this way, a location in the image of the sub-objects for one or more sets of dilated voxels can be determined, for example, in sequence by layer.

In the example embodiment 400, the volume reconstructor 124 further comprises a dilated voxel dissolver 408 configured to dissolve a set of dilated voxels into the sub-objects. For example, those dilated voxels 450 identified by the neighboring dilated voxel identifier 406 can be dissolved into the sub-objects identified by the neighboring dilated voxel identifier 406. In this way, in this example, image data 160 can be generated that comprises identified sub-objects having a volume approximate to a volume of the potential compound object from which they were separated.

In another aspect, unwanted splitting of compound objects can occur when a representation of a non-compound physical object in an image is separated into two or more sub-objects. This undesirable separation can occur, for example, with multi-part objects (e.g., explosives), porous objects, certain electronics, and where an imaging artifact may divide an object. Certain properties of sub-objects can be analyzed to determine whether undesirable separation may have occurred.

In one embodiment, connectivity of two or more sub-objects may be analyzed to determine whether undesirable separation occurred. FIG. 5 is a component block diagram of an example embodiment 500 of a connectivity merger 130 that can be configured to merge distinct sub-objects having a connectivity ratio within a pre-determined connectivity threshold. In this embodiment 500, image data for volume reconstructed sub-objects can be sent to a connectivity determiner 502, which can be configured to determine a connectivity ratio of distinct sub-objects 550. For example, when the sub-objects were separated by a connected object splitter (see FIG. 3, 122) and volume reconstructed by a volume reconstructor (see FIG. 4, 124), an outer layer of volume space units (e.g., voxels) from respective sub-objects can be spatially connected (e.g., a portion of the sub-objects can be touching each other). In this example, the connectivity determiner 502 can calculate a ratio 550 of a number of connected surface voxels between respective sub-objects to the volume of the sub-object.

In the example embodiment 500, the connectivity merger 130 can further comprise a connectivity threshold comparison component 504, which can be configured to compare the connectivity ratio of the distinct sub-objects 550 to a pre-determined connectivity threshold 552. For example, a threshold ratio 552 for connection between sub-objects can be determined by testing a variety of objects by subjecting them to similar scanning and compound object splitting. In another example, a connectivity ratio threshold 552 may be calculated based on certain variables associated with the system. It will be appreciated that the systems and techniques, described herein, are not limited to determining a connectivity ratio threshold 552 in any particular manner. Those skilled in the art may devise alternate methods for determining a connectivity ratio threshold 552.

In this embodiment, the threshold comparison component 504 can compare a connectivity ratio of distinct sub-objects 550 to a connectivity ratio threshold 552 to determine whether the sub-objects should be merged into one physical object, or remain as separated sub-objects. For example, if a connectivity ratio of distinct sub-objects 550 is greater than the connectivity ratio threshold 552, the connectivity merger 130 can generate image data comprising a representation of merged sub-objects 162 (e.g., the sub-objects can be merged back into a distinct physical object). Otherwise, in this example, the connectivity merger 130 can generate image data still comprising a representation of distinct sub-objects 162.

Further, in another example, where a potential compound object may have been separated into more than two sub-objects, the connectivity merger 130 can determine connectivity and compare to a threshold for respective sub-objects. In this way, in this example, resulting image data 162 may comprise sub-objects which are not distinct physical objects and should not have been split by a splitter but were not merged by the connectivity merger. As another example, resulting image data 162 may comprise a combination of merged sub-objects and unmerged sub-objects, such as where a potential compound object was split into three sub-objects, but should have been split into two.

In this aspect, in another embodiment, compactness of two or more sub-objects may be analyzed to determine whether undesirable separation occurred. As an example, while components of a same object are expected to form spatially compact combinations, parts of an actual compound object may be expected to be arranged in random positions and orientations with respect to each other, thereby forming less compact combinations. In this example, a property that can describe object compactness is an Eigen-box fill ratio (EBFR).

Figure 6:
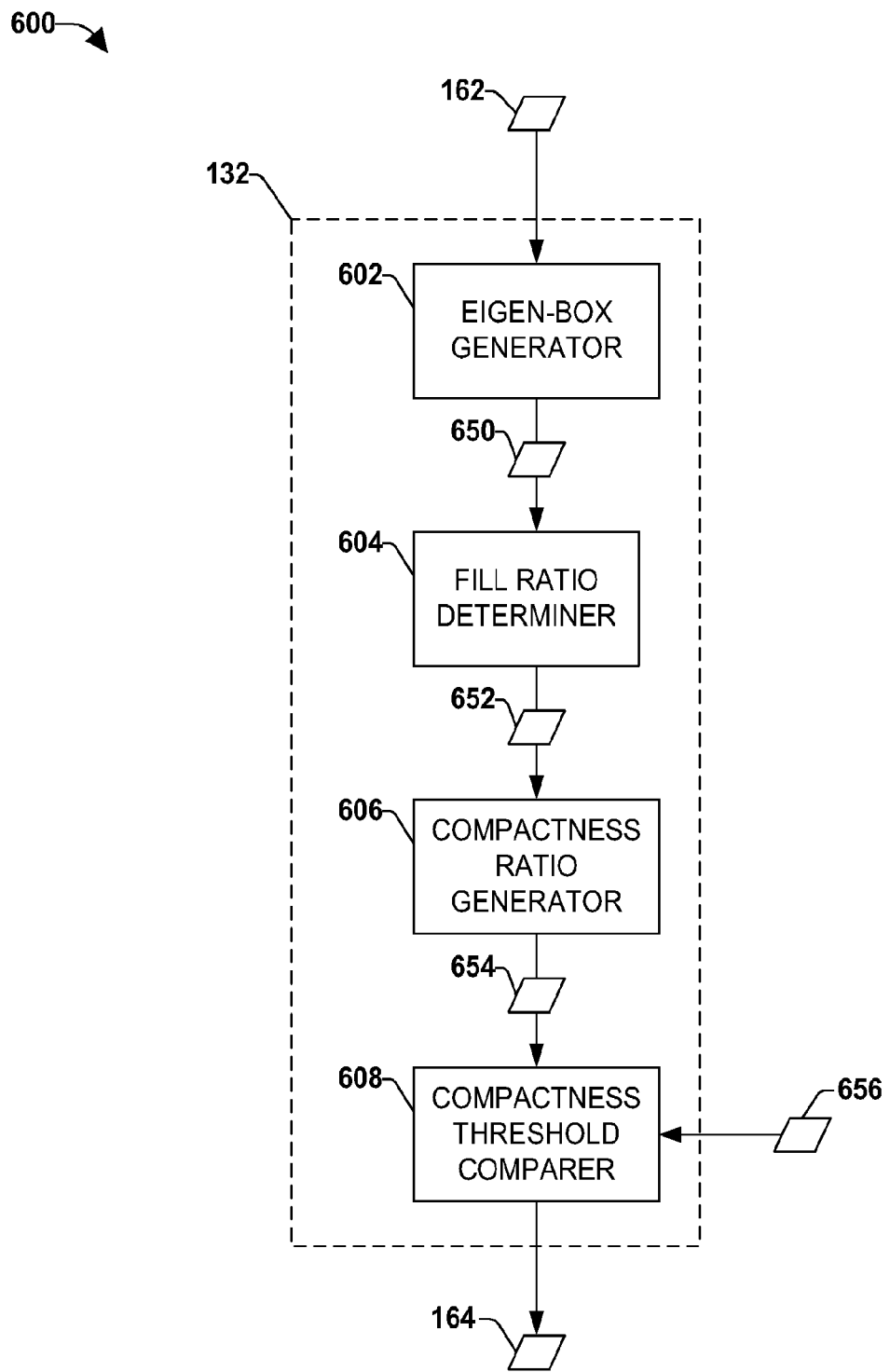
FIG. 6 is a schematic block diagram illustrating one embodiment of one or more components of an environment wherein compound object splitting of objects in an image may be implemented as provided herein.

FIG. 6 is a component block diagram of an example embodiment 600 of a compactness merger 132 that can be configured to merge distinct sub-objects that have a compactness ratio within a pre-determined compactness threshold. In this example embodiment 600, image data 162 (e.g., from the connectivity merger) comprising representations of sub-objects is sent to an Eigen-box generator 602, which can be configured to generate an Eigen-box 650 for the respective distinct sub-objects and a union of the sub-objects, for example, that were separated from a potential compound object. As an example, an Eigen-box 650 can be generated that accommodates an entirety of an object while having a least amount of volume (e.g., a smallest box that can fit the object), for respective sub-objects, and for the union of the sub-objects. In this example, Eigen-boxes can be generated for unions of pairs of sub-objects that are connected, which may result in several combinations of pairs of sub-objects from a same potential compound object (e.g., if a potential compound object was separated into more than two sub-objects).

In the example embodiment 600, the compactness merger 132 further comprises a fill ratio determiner 604 that can be configured to calculate a fill ratio 652 for an object in an Eigen-box (e.g., an EBFR). As an example, for respective sub-objects and for the unions of the sub-objects, the fill ratio determiner 604 can calculate how much the object fills the Eigen-box.

In the example embodiment 600, the compactness merger 132 further comprises a compactness ratio generator 606, which can be configured to compare a combination of EBFRs of the respective sub-objects to an EBFR of a union of the respective sub-objects, for example, to generate a compactness ratio for the sub-objects 654. As an example, the compactness ratio generator 606 may determine an increase in an EBFR from respective sub-objects to the EBFR of the union of the sub-objects. In this example, the increase may be reflected as a compactness ratio for the pair of sub-objects 654. Further, in this example, compactness ratios may be determined for respective pairs of sub-objects (e.g., where a potential compound object was split into more than two sub-objects), whereby the EBFR for the respective sub-objects of the respective pairs can be compared to the union of the sub-object for the respective pairs.

In the example embodiment 600, the compactness merger 132 further comprises a compactness threshold comparison component 608, which can be configured to compare the compactness ratio of the sub-objects 654 to a pre-determined compactness threshold 656. For example, a compactness threshold 656 for compactness of sub-objects can be determined by testing a variety of objects by subjecting them to similar scanning and compound object splitting. In another example, a compactness threshold 656 may be calculated based on certain variables associated with the system. It will be appreciated that the systems and techniques, described herein, are not limited to determining a compactness threshold 656 in any particular manner. Those skilled in the art may devise alternate methods for determining a compactness threshold 656.

In this embodiment, the compactness threshold comparison component 608 can compare a compactness ratio of the sub-objects 654 to a compactness threshold 656 to determine whether the sub-objects should be merged into one physical object, or remain as separated sub-objects. For example, if a compactness ratio of the sub-objects 654 is greater than the compactness threshold 656, the compactness merger 132 can generate image data comprising a representation of merged sub-objects 164 (e.g., for the pair of sub-objects tested for compactness). Otherwise, in this example, the compactness merger 132 can generate image data still comprising a representation of distinct sub-objects 164.

It will be appreciated that, while the embodiments described above show the compactness merger 132 disposed after the connectivity merger 130, the techniques and systems described herein are not limited to these embodiments. Those skilled in the art may devise alternate arrangements for these components in a system. For example, both the connectivity merger 130 and compactness merger 132 may receive image data 160, comprising volume reconstructed sub-objects, for merging determinations. Further, in another example, the compactness merger 132 may be disposed before the connectivity merger 130; and/or both components may analyze image data from each other to determine merging.

A method may be devised for separating a compound object into sub-objects in an image generated by an imaging apparatus. In one embodiment, the method may be used by a threat determination system in a security checkpoint that screens passenger luggage for potential threat items. In this embodiment, an ability of a threat determination system to detect potential threats may be reduced if compound objects are introduced, as computed properties of the compound object may not be specific to a single physical object. Therefore, one may wish to separate the compound object into distinct sub-objects of which it is comprised.

Figure 7:
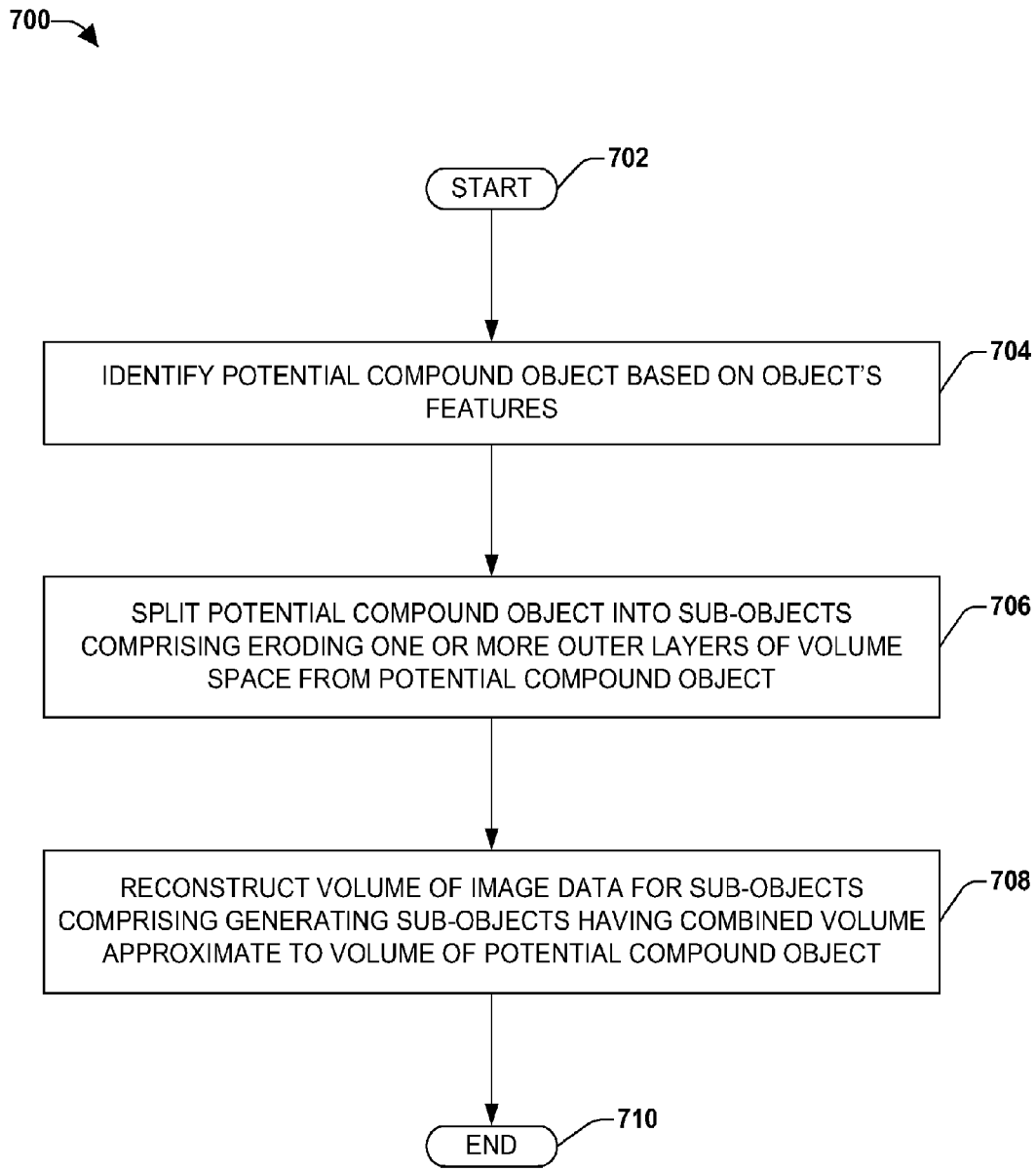
FIG. 7 is a flow chart diagram of an example method for compound object splitting in an image produced by imaging of one or more objects.

FIG. 7 is a flow chart diagram of an example method 700 for separating a compound object into sub-objects in an image generated by an imaging apparatus. The example method 700 begins at 702 and involves identifying a potential compound object based on an object's features, at 704. As an example, one can identify candidate objects, from representations of objects in images from the imaging apparatus, for compound object separation. In one embodiment, available features of an object (e.g., object properties, such as the object's shape properties) can be compared with pre-determined properties for known compound objects. In this way, for example, one can determine if the object in question comprises known compound object properties.

Figure 12:
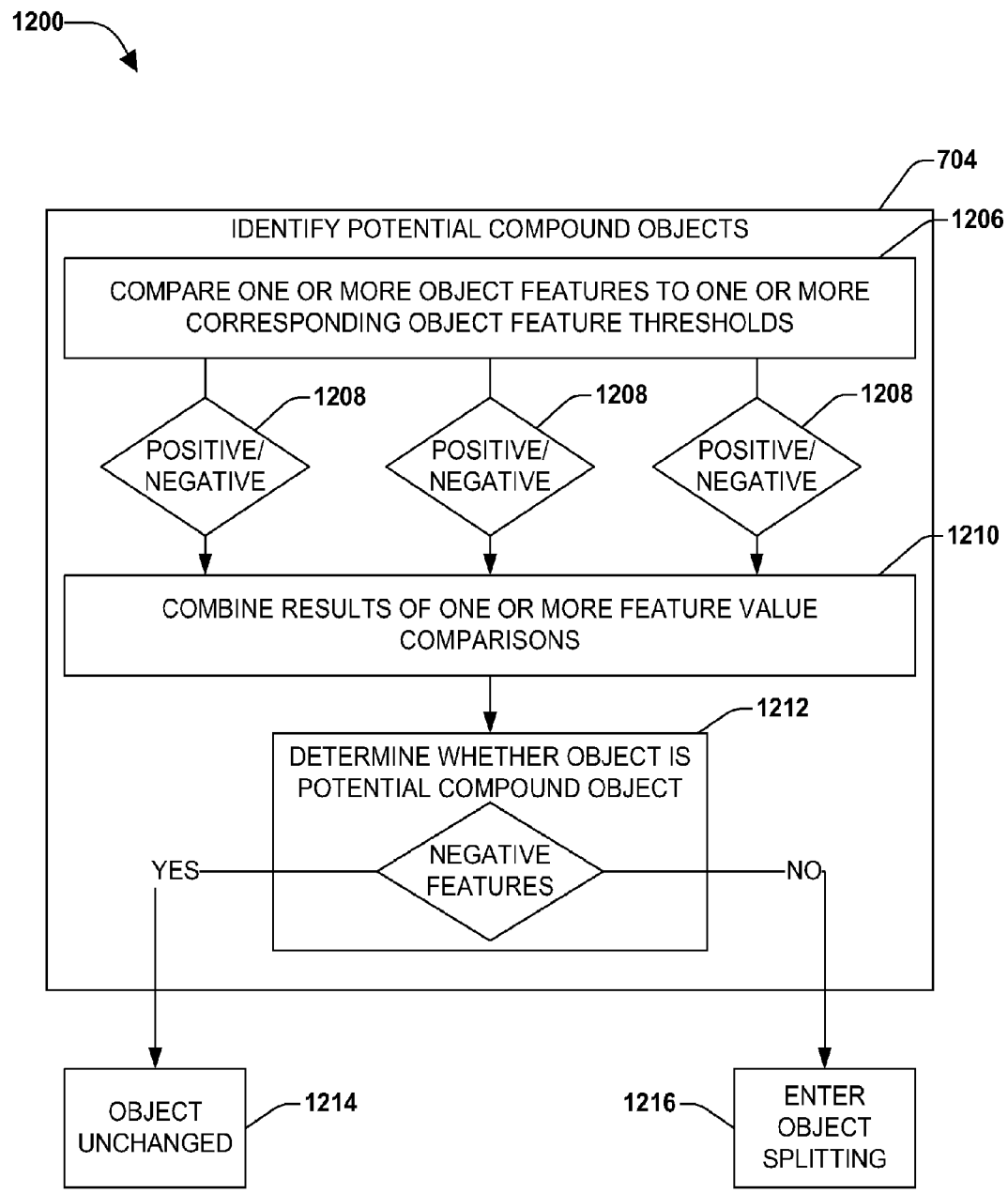
FIG. 12 is a flow chart diagram of one embodiment of an example portion of a method for object splitting in an image produced by imaging of one or more objects.

FIG. 12 is a flow chart diagram of an example embodiment 1200 of identifying potential compound objects 704. In this embodiment 1200, one or more object features are compared to one or more corresponding object feature thresholds, at

1206. For example, a series of linear classifiers can be utilized, with respective classifiers corresponding to an object feature. The linear classifiers, in this example, can determine whether the object feature meets the threshold for a compound object, at 1208, thereby yielding a positive result for a compound object.

At 1210, in the example embodiment 1200, the one or more results of the object feature comparisons can be combined, and at 1212, it can be determined whether the object is a potential compound object based on the combined results. In this embodiment 1200, determining whether the object is a potential compound object can be based on a desired number of positive results from the feature comparison. For example, a desired number of positive results may be that all of the object features yield a positive result for a compound object. In this example, if any of the feature comparisons yield a negative result, the object may be deemed to not be a compound object, and, as such, can remain unchanged, at 1214. On the other hand, in this embodiment, if the object is determined to be a potential compound object, it may be sent for object splitting, at 1216.

Turning back to FIG. 7, at 706 in the example method 700, a potential compound object can be split into sub-objects, which can comprise eroding one or more outer layers of volume space (e.g., voxels) from the potential compound object. In one embodiment, weak connections in the potential compound object can be broken by erosion of outer layers of volume space units. Further, in this embodiment, connectivity analysis can be performed after respective erosions, and resulting sub-objects can be labeled as separate objects.

Figure 13:
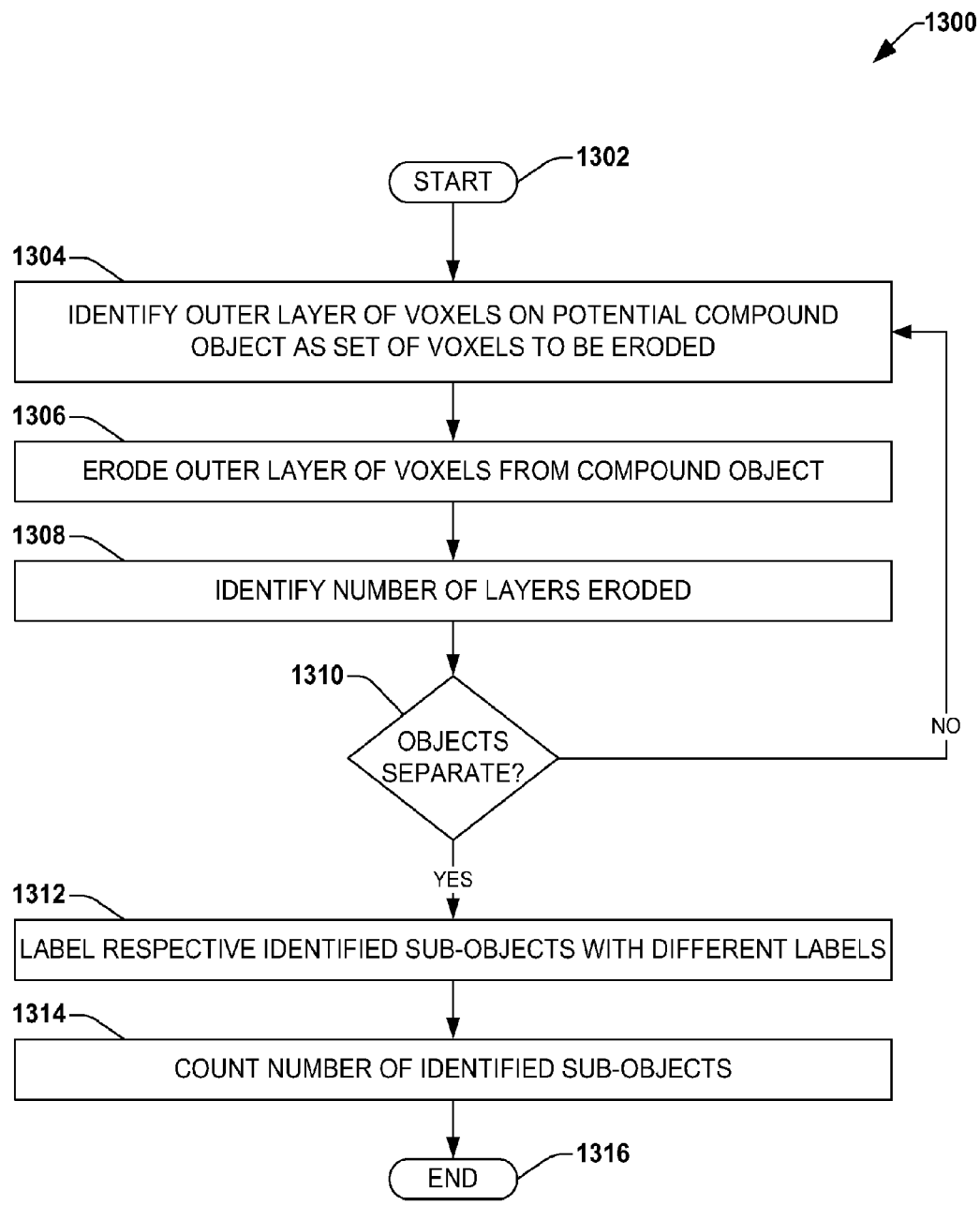
FIG. 13 is a flow chart diagram of one embodiment of an example portion of a method for object splitting in an image produced by imaging of one or more objects.

FIG. 13 is a flow chart diagram of an example embodiment 1300 of the potential compound object splitting (706). The example embodiment 1300 begins at 1302 and involves identifying an outer layer of voxels on a potential compound object as a set of voxels to be eroded, at 1304. For example, a representation of a compound object in an image can comprise a group of connected voxels. In this example, an outer layer of the voxels from the potential compound object in the image can be identified as a first set of voxels to be removed from the potential compound object.

At 1306, one or more outer layer of voxels can be eroded (removed) from the potential compound object. For example, the set of voxels identified in 1304 as the outer layer can be removed from the representation of the potential compound object in the image. At 1308, a number of layers removed can be identified. For example, one can count respective layers removed by the erosion step in 1306.

At 1310, one can determine whether the potential compound object has been separated into two or more sub-objects after respective erosions. For example, connectivity analysis can be used on the object in the image to determine whether voxels are separated or remain spatially connected. In this embodiment 1300, if it is determined that the potential compound object has not been separated, one can return to step 1304 and proceed through another layer erosion. However, if it is determined that the object has been separated, at 1312, respective identified sub-object can be labeled as separate objects. For example, attaching labels to the sub-objects represented in the image by groups of voxels can enable respective sub-objects to be identified as separate, distinct objects in the image.

At 1314, in the example embodiment 1300, a number of sub-objects are identified (e.g., counted). A sub-object count, for example, can facilitate later volume reconstruction and possible merger of sub-objects. Having counted a number of sub-objects, the example embodiment 1300 ends at 1316.

Turning back to FIG. 7, at 708, in the example method 700, image data volume (e.g., for the sub-objects) is reconstructed, which can comprise generating sub-objects that have a combined volume approximate to that of the potential compound object. For example, the erosion of one or more layers of voxels from a representation of the potential compound object in the image can reduce a total volume of the resulting sub-objects, as volume space has been removed from the object. In order to maintain a volume of the sub-objects close to the potential compound object, in this example, the volume of the sub-objects can be reconstructed by adding voxels back onto the sub-objects.

In one embodiment, reconstructing a volume of image data can comprise dissolving a set of eroded voxels into the sub-objects, where the set of eroded voxels comprises a layer of voxels that are spatially neighboring the sub-objects' outer layer of voxels. For example, when voxels were eroded from the outer layer of the object, the eroded voxels were neighboring voxels left in the sub-objects. In this embodiment, the eroded voxels that neighbor voxels in the sub-objects can be returned to the appropriate sub-object. Further, in this embodiment, if more than one layer (set) of voxels was removed during erosion, for example, the layers can be returned to the sub-object sequentially. In this way, in this example, respective sub-objects can increase their volume (e.g., by adding voxels removed from them during erosion), while remaining distinct and separate representations of objects in the image.

In another embodiment, reconstructing a volume of image data can comprise dissolving a set of dilated voxels into the sub-objects, where the set of dilated voxels comprises voxels identified in an object by an object dilator prior to identifying a potential compound object. In this embodiment, for example, compound object separation may be a part of a larger object identification and threat determination method. In this example, during object identification, a dilator can be used. Dilation can involve adding spatially connected voxels to an object, for example, in order to capture a desired amount of the representation of the object in the image for identification. In this embodiment, those dilated voxels can be added to the sub-objects if the dilated voxels are spatially connected to the sub-objects. In this way, for example, a volume for the sub-objects can be increased, while maintaining sub-object separation.

Having reconstructed the volume of the sub-objects, the example method 700 ends at 710.

In another aspect, some object obtained after volume reconstruction can be a part of a same physical object. For example, the sub-objects may actually belong connected together as one object, and not separated as distinct objects. In one embodiment, different components that make up a compound object are typically weakly connected to one another, while those parts that are undesirably separated from a same physical object are not weakly connected. In this embodiment, one can merge sub-objects that have greater connectivity to one another, while leaving separated those with less connectivity. In one example, connectivity can be represented as an interface surface to object volume ratio, and the connectivity can be compared to a threshold for compound objects.

Figure 8:
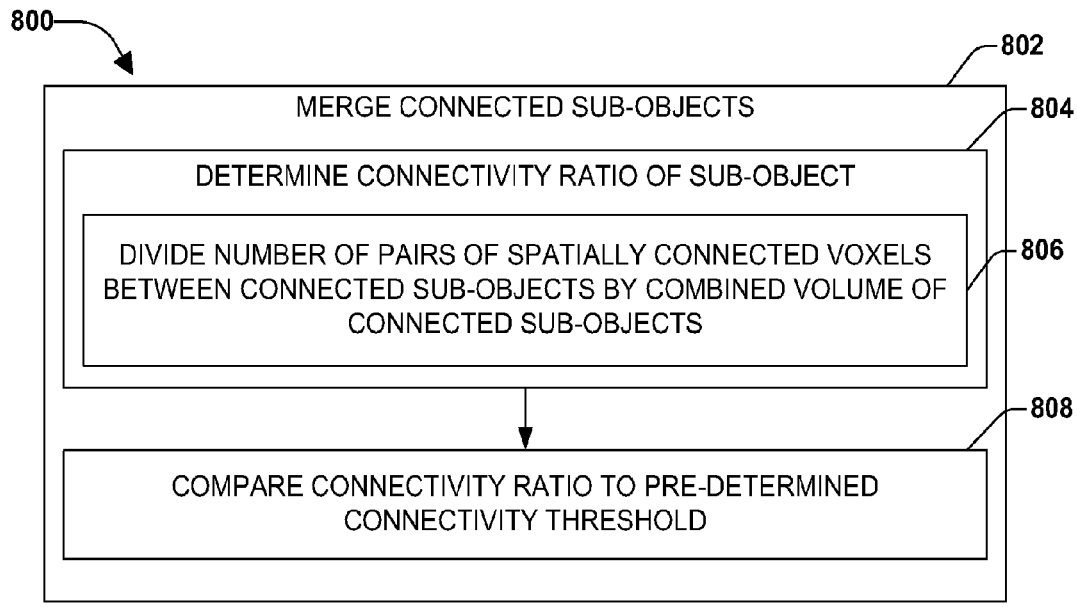
FIG. 8 is a flow chart diagram of one embodiment of an example portion of a method for object splitting in an image produced by imaging of one or more objects.

FIG. 8 is a flow chart diagram 800 illustrating an example embodiment of merging connected sub-objects 802. At 804, one can determine a connectivity ratio of connected sub-objects (e.g., a pair of sub-objects). Determining a connectivity ratio, for example, can involve dividing a number of pairs of spatially connected voxels between the connected sub-objects by a combined volume of the connected sub-objects, at 806. For example, for a pair of connected sub-objects, one can determine a number of pairs of voxels that are connected between the sub-objects (e.g., each pair representing one voxel from respective sub-objects on respective sides of the connection). In this example, this number can be divided by a total number of voxels from a union of the sub-objects, to yield a connectivity ratio for the sub-objects.

At 808, in the example embodiment 800, the connectivity ratio for the sub-objects is compared with a pre-determined connectivity threshold, for example, to determine whether the two objects should be merged or remain separated sub-objects. For example, if the connectivity ratio of the sub-objects is less than a threshold, which may be pre-determined by testing known compound objects, the sub-objects are likely part of a compound object and remain separated.

Figure 9:
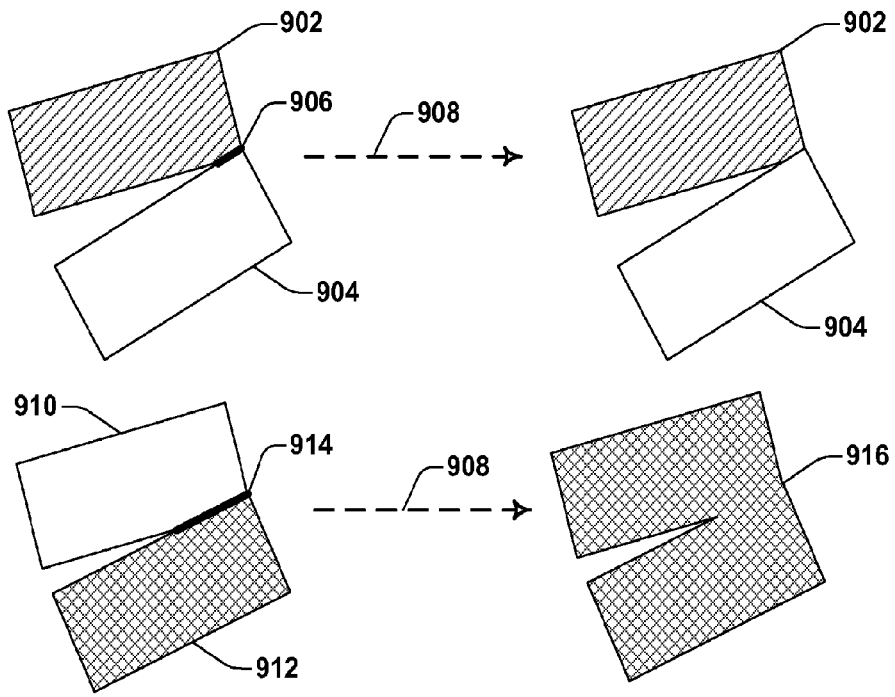
FIG. 9 is an illustration of example objects subjected to a portion of a method for object splitting in an image produced by imaging of one or more objects.

FIG. 9 is diagram illustrating examples of connected sub-objects, and resulting merging based on connectivity. In these examples, sub-objects 902 and 904 are connected at 906 by a number of pairs of connected voxels from respective sub-objects. In this example, after determining whether the connected sub-objects can be merged 908, the sub-objects remain separated at 902 and 904, as the connectivity ratio between the two sub-objects may have been less than the threshold for merging sub-objects.

Sub-objects 910 and 912 are connected at 914 by a greater number of pairs of connected than 906. In this example, after determining whether the connected sub-objects can be merged 908, the sub-objects are merged into a single object at 916. In this example, the connectivity ratio between the two sub-objects 910 and 912 may have been greater than the threshold for merging sub-objects.

In another embodiment, in this aspect, after connectivity merging some non-compound objects may still be undesirably separated into distinct sub-objects. For example, while components of a same object can be expected to form a spatially compact combination, parts of a compound object can be expected to form less compact combinations due to random positions and orientations of various sub-parts of the compound object. In one embodiment, one can examine a pair of connected sub-objects and determine a difference between an Eigen-box fill ratio (EBFR) for respective sub-objects and an EBFR for a union of the pair of sub-objects (e.g., a potential compound object that is made up of two sub-objects). In this embodiment, for example, this difference may be used to determine if the sub-object can be merged into a single object.

Figure 10:
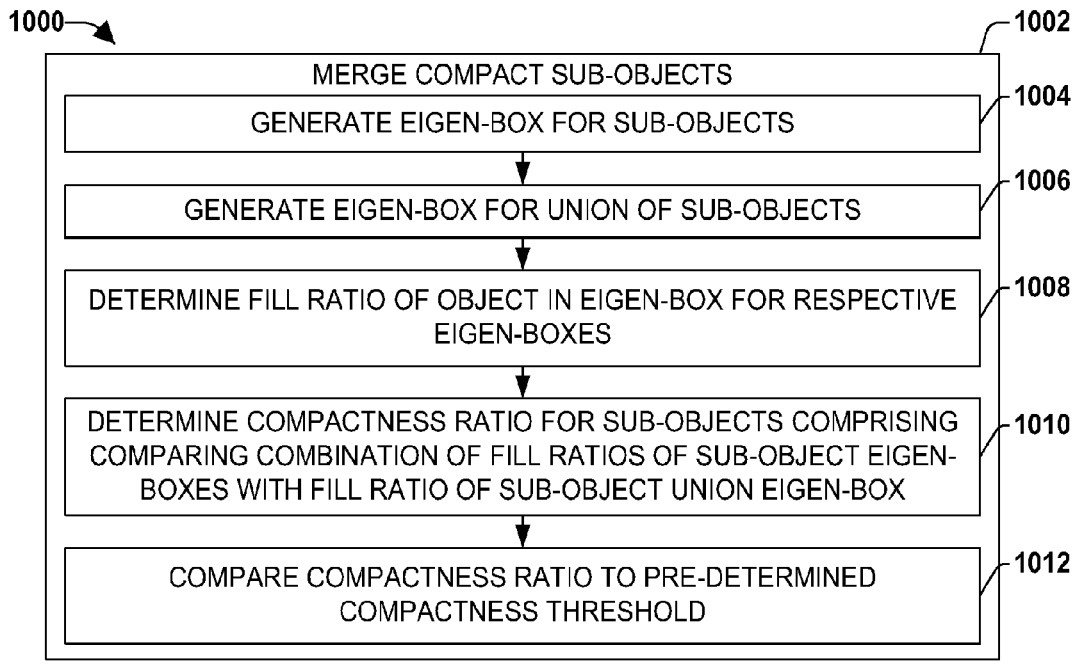
FIG. 10 is a flow chart diagram of one embodiment of an example portion of a method for object splitting in an image produced by imaging of one or more objects.

FIG. 10 is a flow chart diagram 1000 illustrating an example embodiment of merging compact sub-objects 1002. At 1004, an Eigen-box is generated for respective sub-objects. For example, a box having a least volume that can fit a sub-object can be generated for respective sub-objects in a pair of connected sub-objects. At 1006, an Eigen-box can be generated for a union of the sub-objects. For example, a box having a least volume that can fit the union of the pair of sub-objects can be generated.

At 1008, in the example embodiment 1000, a fill ratio of an object in an Eigen-box can be determined for the respective Eigen-boxes. For example, an EBFR can be determined for respective boxes containing the sub-objects in a pair of connected sub-objects, and an EBFR can be determined for the Eigen-box containing the union of the pair of sub-objects. In one embodiment, determining a fill ratio for an object can comprise comparing a volume of the Eigen-box that is filled by the object to a volume of the Eigen-box that is not filled by the object. For example, the comparison can yield a ratio of filled to unfilled, or a percentage of filled.

At 1010, a compactness ratio for the sub-objects can be determined, which can comprise comparing a combination of the fill ratios of the sub-object Eigen-boxes with the fill ratio of the sub-object union Eigen-box. For example, a fill ratio of a sub-object may be expected to be greater than a fill ratio of a union of a pair of connected sub-objects. In this example, a difference in the two fill ratios may be determined, and expressed as a compactness ratio for the sub-objects.

At 1012, the compactness ratio is compared to a pre-determined compactness threshold, for example, to determine whether the sub-objects can be merged. For example, if the compactness ratio of the sub-objects is greater than a threshold, which may be pre-determined by testing known compound objects, the sub-objects are likely parts of a single physical object and can be merged.

Figure 11:
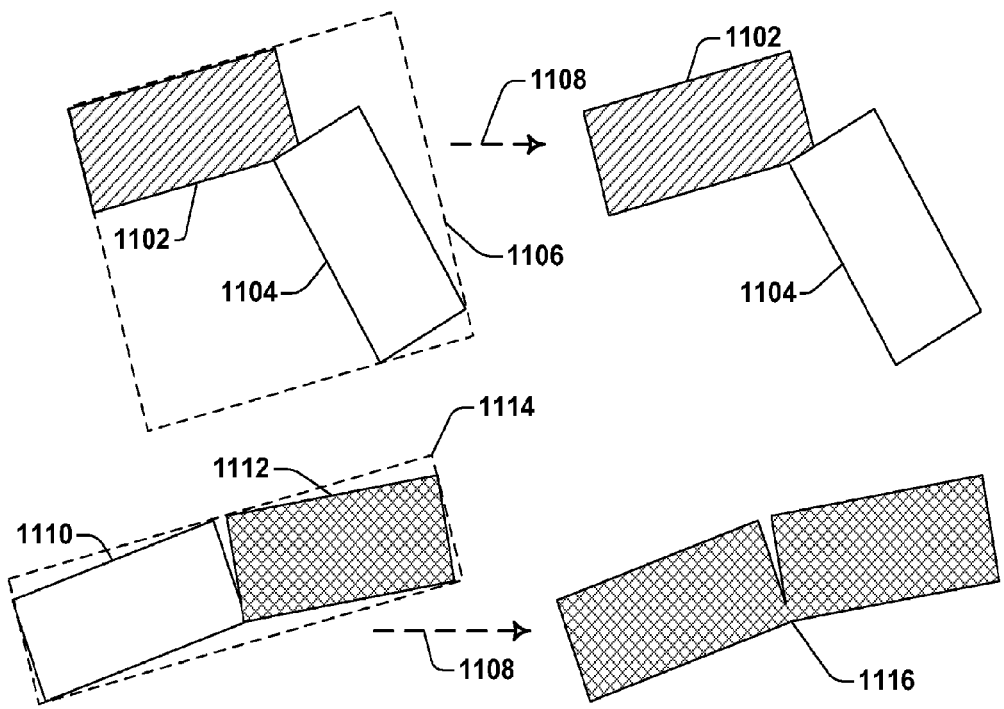
FIG. 11 is an illustration of example objects subjected to a portion of a method for object splitting in an image produced by imaging of one or more objects.

FIG. 11 is a diagram illustrating examples of connected sub-objects, and resulting merging based on compactness. In the examples, an Eigen-box 1106 has been generated for a union of a pair of connected sub-objects 1102 and 1104. In this example, after comparing a compactness ratio for the sub-objects to a compactness threshold, at 1108, the sub-objects remain separated as distinct and separate objects. In this example, the compactness ratio of the pair of connected sub-objects 1102 and 1104 may have been less than the compactness threshold.

In the examples of FIG. 11, an Eigen-box 1114 has been generated for a union of a pair of connected sub-objects 1110 and 1112. In this example, after comparing a compactness ratio for the sub-objects to a compactness threshold, at 1108, the sub-objects are merged into a single object 1116. In this example, the compactness ratio of the pair of connected sub-objects 1110 and 1112 may have been greater than the compactness threshold.

It will be appreciated that, a potential compound object can be separated into more than two sub-objects by the techniques described above. In one embodiment, for example, if more than two sub-objects are separated from a potential compound object, more than two sub-objects may be merged. In this example, merging can comprise comparing connectivity and/or compactness between a first pair of connected sub-objects, then comparing connectivity and/or compactness between one of the first pair of sub-objects and another connected sub-object that was not one of the first pair. Further, if a pair of connected sub-objects is merged, merging can comprise comparing connectivity and/or compactness between the merged object to another sub-object that is connected to the merged object.

Figure 14:
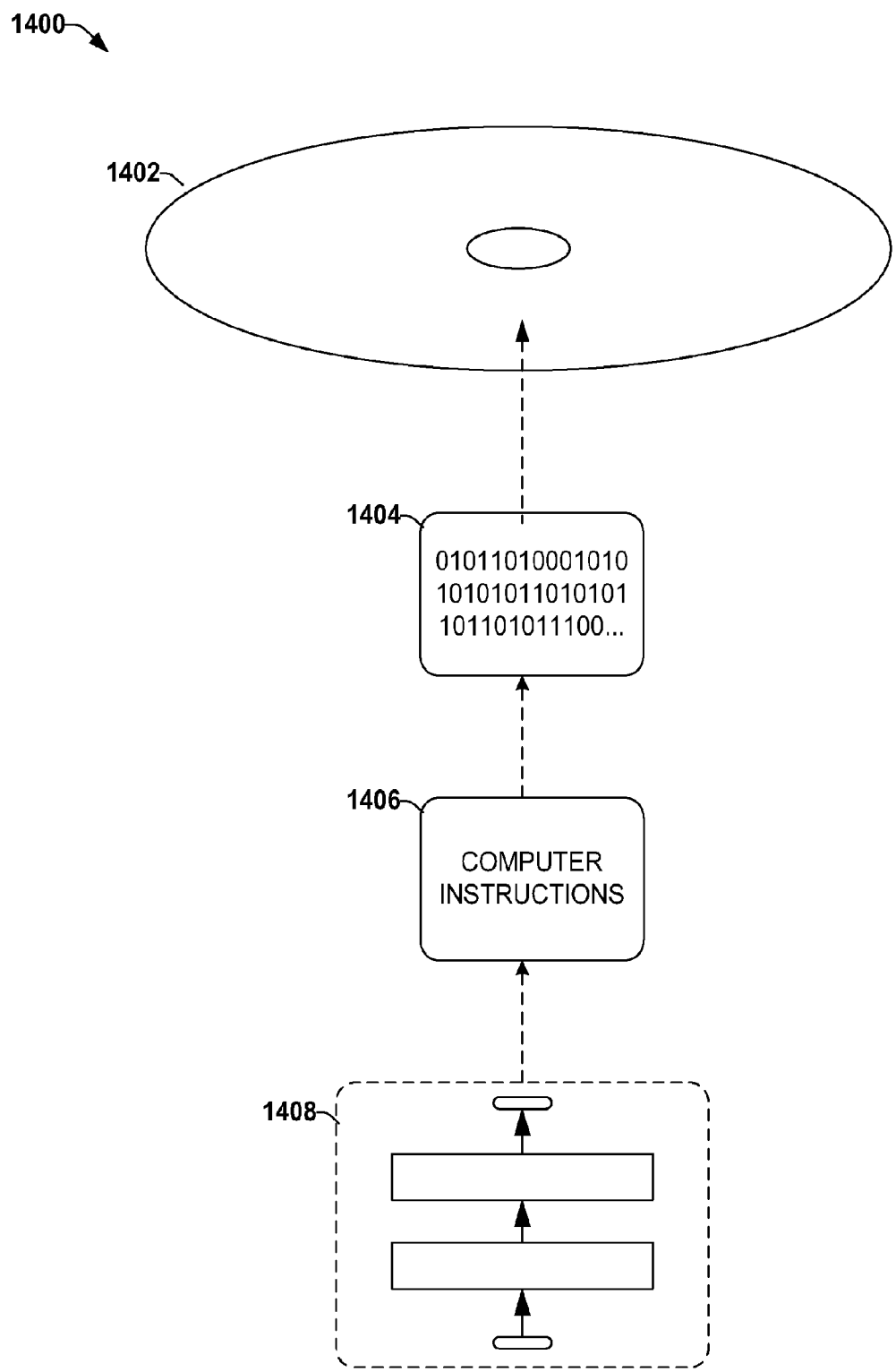
FIG. 14 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 14, wherein the implementation 1400 comprises a computer-readable medium 1402 (e.g., a CD-R, DVD-R, or a platter of a hard disk drive), on which is encoded computer-readable data 1404. This computer-readable data 1404 in turn comprises a set of computer instructions 1406 configured to operate according to one or more of the principles set forth herein. In one such embodiment 1400, the processor-executable instructions 1406 may be configured to perform a method, such as the example method 700 of FIG. 7, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for compound object separation, comprising:
   a compound object splitter component configured to generate, from a representation of a potential compound object, a first representation of a first potential sub-object and a second representation of a second potential sub-object by eroding a first set of voxels from the representation of the potential compound object; and
   a volume reconstructor component configured to generate a first image representing the first potential sub-object from the first representation and a second image representing the second potential sub-object from the second representation, the volume reconstructor component comprising:
      a neighboring eroded voxel identifier component configured to group one or more voxels, of the first set of voxels, that are spatially connected to the first representation to generate a second set of voxels; and
      an eroded voxel dissolver component configured to dissolve the second set of voxels to generate at least a first portion of the first image.

2. The system of claim 1, comprising a connectivity merger component configured to merge the first image with the second image when a connectivity ratio for the first image and the second image is within a pre-determined connectivity threshold.

3. The system of claim 2, the connectivity ratio substantially corresponding to a number of pairs of spatially connected voxels between the first image and the second image divided by a combined volume of the first potential sub-object as represented by the first image and the second potential sub-object as represented by the second image.

4. The system of claim 1, comprising a compactness merger component configured to merge the first image with the second image when a compactness ratio for the first image and the second image is within a pre-determined compactness threshold.

5. The system of claim 4, the compactness merger component comprising:
   an Eigen-box generator component configured to generate a first sub-object Eigen-box based upon the first image, a second sub-object Eigen-box based upon the second image, and a union Eigen-box for a union of the first potential sub-object and the second potential sub-object based upon the first image and the second image;
   a fill ratio determiner component configured to calculate a first fill ratio for the first sub-object Eigen box, a second fill ratio for the second sub-object Eigen box, and a third fill ratio for the union Eigen-box; and
   a compactness ratio generator component configured to compare the first fill ratio, the second fill ratio, and the third fill ratio.

6. The system of claim 1, comprising an entry control component configured to identify the representation of the potential compound object based upon one or more features of the potential compound object.

7. The system of claim 1, the compound object splitter component comprising a volume space eroder component configured to erode the first set of voxels from the representation of the potential compound object to generate an eroded representation of the potential compound object.

8. The system of claim 7, comprising a sub-object identifier component configured to identify the first representation and the second representation from the eroded representation of the potential compound object.

9. The system of claim 1, the volume reconstructor component comprising a dilated voxel dissolver component configured to dissolve a third set of voxels to generate at least a second portion of the first image.

10. The system of claim 9, the volume reconstructor component comprising:
    a neighboring dilated voxel identifier component configured to identify one or more voxels that have been dilated and that are spatially connected to the first representation to generate the third set of voxels.

11. A method for compound object separation, comprising:
    eroding a first set of voxels from a representation of a potential compound object to generate a first representation of a first potential sub-object and a second representation of a second potential sub-object;
    generating a first image representing the first potential sub-object from the first representation;
    generating a second image representing the second potential sub-object from the second representation;
    generating a first sub-object Eigen-box based upon the first image;
    generating a second sub-object Eigen-box based upon the second image;
    generating a union Eigen-box for a union of the first potential sub-object and the second potential sub-object based upon the first image and the second image;
    determining a first fill ratio for the first sub-object Eigen-box, a second fill ratio for the second sub-object Eigen box, and a third fill ratio for the union Eigen-box;
    determining a compactness ratio describing a compactness between the first potential sub-object and the second potential sub-object based upon a comparison of the first fill ratio, the second fill ratio, and the third fill ratio; and merging the first image with the second image when the compactness ratio meets a pre-determined compactness threshold.

12. The method of claim 11, the merging comprising merging the first image with the second image when a connectivity ratio for the first image and the second image meets a pre-determined connectivity threshold.

13. The method of claim 12, the connectivity ratio substantially corresponding to a number of pairs of spatially connected voxels between the first image and the second image divided by a combined volume of the first potential sub-object as represented by the first image and the second potential sub-object as represented by the second image.

14. The method of claim 11, the determining a first fill ratio comprising comparing a first volume of the first sub-object Eigen-box that is filled by the first potential sub-object to a second volume of the first sub-object Eigen-box that is not filled by the first potential sub-object.

15. The method of claim 11, comprising, before the eroding, identifying the representation of the potential compound object, the identifying comprising comparing one or more object feature values to one or more corresponding object feature threshold values.

16. The method of claim 11, the generating a first image comprising at least one of:
dissolving an eroded voxel; or
dissolving a dilated voxel.

17. A system for compound object separation, comprising:
a compound object splitter component configured to generate, from a representation of a potential compound object, a first representation of a first potential sub-object and a second representation of a second potential sub-object by eroding a first set of voxels from the representation of the potential compound object; and
a volume reconstructor component configured to generate a first image representing the first potential sub-object from the first representation and a second image representing the second potential sub-object from the second representation, the volume reconstructor component comprising:
a neighboring dilated voxel identifier component configured to identify one or more voxels that have been dilated and that are spatially connected to the first representation to generate a second set of voxels; and
a dilated voxel dissolver component configured to dissolve the second set of voxels to generate at least a first portion of the first image.

18. The system of claim 17, the volume reconstructor component comprising an eroded voxel dissolver component configured to dissolve at least one voxel of the first set to generate at least a second portion of the first image.

19. The system of claim 17, comprising a compactness merger component configured to merge the first image with the second image when a compactness ratio for the first image and the second image is within a pre-determined compactness threshold.

20. The system of claim 19, the compactness merger component comprising:
an Eigen-box generator component configured to generate a first sub-object Eigen-box based upon the first image, a second sub-object Eigen-box based upon the second image, and a union Eigen-box for a union of the first potential sub-object and the second potential sub-object based upon the first image and the second image;
a fill ratio determiner component configured to calculate a first fill ratio for the first sub-object Eigen box, a second fill ratio for the second sub-object Eigen box, and a third fill ratio for the union Eigen-box; and
a compactness ratio generator component configured to compare the first fill ratio, the second fill ratio, and the third fill ratio.

* * * * *